United States Patent

Hikosaka et al.

Patent Number: 5,981,054
Date of Patent: Nov. 9, 1999

[54] MAGNETIC RECORDING MEDIUM AND METHOD FOR MANUFACTURING THE SAME

[75] Inventors: Takashi Hikosaka, Tokyo; Tsutomu Tanaka, Yokohama; Yoichiro Tanaka, Kawasaki; Katsutaro Ichihara, Yokohama; Keiichiro Yusu, Kawasaki, all of Japan; Akira Kikitsu, Tucson, Ariz.

[73] Assignee: Kabushiki Kaisha Toshiba, Kawasaki, Japan

[21] Appl. No.: 08/897,677

[22] Filed: Jul. 21, 1997

[30] Foreign Application Priority Data

Jul. 22, 1996 [JP] Japan .................... 8-192073
Jul. 23, 1996 [JP] Japan .................... 8-193481
Jul. 23, 1996 [JP] Japan .................... 8-193482

[51] Int. Cl.$^6$ ....................................... G11B 5/66
[52] U.S. Cl. .............. 428/328; 428/403; 428/694 T; 428/694 BA; 428/694 BM; 428/900; 204/192.2
[58] Field of Search ............ 428/694 BA, 694 T, 428/694 BM, 328, 403, 900; 204/192.2

[56] References Cited

U.S. PATENT DOCUMENTS

| | | | |
|---|---|---|---|
| 5,462,809 | 10/1995 | Berkowitz | 428/546 |
| 5,591,532 | 1/1997 | Berkowitz | 428/611 |
| 5,652,054 | 7/1997 | Kikitsu | 428/328 |
| 5,868,910 | 2/1999 | Berkowitz | 204/192.2 |

FOREIGN PATENT DOCUMENTS

| | | |
|---|---|---|
| 7-65345 | 3/1995 | Japan . |
| 7-311929 | 11/1995 | Japan . |
| 8-77543 | 3/1996 | Japan . |
| 8-129740 | 5/1996 | Japan . |
| 8-138224 | 5/1996 | Japan . |

Primary Examiner—Leszek Kiliman
Attorney, Agent, or Firm—Oblon, Spivak, McClelland, Maier & Neustadt, P.C.

[57] ABSTRACT

A magnetic recording medium comprising a substrate and a magnetic film formed on the substrate, the magnetic film including magnetic crystal grains in a non-magnetic matrix and satisfying the condition given below:

$$d^2 \cdot t \cdot Ir/(v \cdot Isb) \geq 0.75$$

where
- t: a thickness of the magnetic film;
- Ir: a remanent magnetization moment of the magnetic film;
- d: an average particle size of the magnetic crystal grains in an intra-film direction of the magnetic film; and
- v·Isb: an activated magnetization moment of the magnetic film.

18 Claims, 6 Drawing Sheets

MAGNETIC RECORDING MEDIUM AND METHOD FOR MANUFACTURING THE SAME

BACKGROUND OF THE INVENTION

The present invention relates to a magnetic recording medium and, in particular, a magnetic recording medium for use in a hard disk apparatus and a method for manufacturing the same.

The magnetic disk apparatus, in particular, a hard disk apparatus using a magnetic recording medium with a magnetic film formed on a rigid disk-like substrate, has often been used as an external memory apparatus for a personal computer, large-sized computer and computer apparatus for word processors, etc., in view of the high recording density, high-speed writable feature and low bit cost, etc., and is highly demanded to further improve the magnetic density for obtaining large recording capacity. In order to enhance the magnetic density, there is a demand for the improvement of a line recording resolution by a magnetic film's high coercive force in the magnetic recording medium. In order to prevent the occurrence of any playback error, there is also a demand for reducing noise in a playback output and improving the quality of the played-back signal.

It has been known that the noise in the playback output from the magnetic recording medium has a relation to the structure of the magnetic recording medium's magnetic film and is increased in the case where a strong magnetic interaction acts between magnetic crystal grains in a ferromagnetic substance constituting the magnetic film. In order to reduce the noise and enhance the quality of the played-back signal, various designs have been attempted to reduce the magnetic interaction between the magnetic crystal grains.

The first method is by enhancing the concentration of Cr added to the magnetic film and making the boundary non-magnetized. The second method is by segregating oxygen at a boundary under the film formation conditions of the magnetic film and the third method is by distributing magnetic crystal grains in a non-magnetic matrix and decreasing the magnetic interaction. Further, it has been considered that a static magnetic interaction is also decreased between the magnetic crystal grains due to the addition of Cr reducing a saturated amount of magnetization of the magnetic crystal grains.

The second and third methods can achieve a higher coercive force without lowering the magnetic anisotropy in the crystal and can realize a high recording density.

Further it has also been known that an activated magnetic moment v·Isb corresponding to the amount of magnetization of magnetically separated magnetic crystal grains has a correlation to the noise amount. As the method for controlling the v·Isb and lowering the noise amount, attempts have been made to decrease the film thickness of the magnetic film. As a result of studies made by the inventors on the case where an error rate is measured on a medium with a magnetic film of reduced thickness, that is, a medium combined with an associated head, it has been found impossible to obtain an improved error rate. It has been considered that the reduced thickness of the magnetic film leads to a fall in the intensity of a played-back signal and never leads to an improved quality of the played-back signal.

Further, the increase of Cr added to the magnetic film also results in a fall in the activated magnetic moment v·Isb. In that case, there also occur a fall in the intensity of a played-back signal and in the quality of the error rate.

As set out above, even if it is possible for the conventional technique to lower the noise in the playback output, there occur a fall in the noise and a fall in the intensity of the played-back signal. It is, therefore, not possible to improve the quality of the played-back signal and effectively to improve the error rate.

Further, even in the above-mentioned first and second methods, if the size of the magnetic crystal grain is reduced, the recorded magnetized state changes with time due to the effect of a thermal fluctuation involved and the noise level is increased, thus leading to an increase in the error rate upon playback. And with the non-magnetization of the boundary the magnetized amount of the magnetic film is decreased, so that the playback output is lowered.

In this way, in the conventional method for non-magnetizing the boundary so as to lower the noise in the output played-back by the head from the magnetic recording medium, the size of the magnetic crystal grains is decreased when the S/N ratio is improved as desired, so that a playback error is increased with the lapse of time due to the effect of thermal fluctuation. Further, the playback output level is also lowered with a volume increase in the non-magnetic boundary.

In the magnetic recording medium, it becomes important that, in order to enhance the line recording density, the width of the magnetization inversion be decreased and the noise of the medium be lowered.

In order to decrease the width of the magnetization inversion it is considered effective to increase the coercive force (Hc) of the medium. With the present hard disk apparatus, therefore, use is made of a magnetic thin-film medium whose Hc is of the order 2,000e. Although the Hc of the medium is currently restricted by the recording capability of the magnetic head, it is essential that, with an enhancing recording capability of the magnetic head, there be a growing demand for a high coercive force (Hc) of the medium.

Some prior arts are known which aim at a high Hc and low noise in the magnetic recording medium.

The following are the known techniques regarding the achievement of a higher coercive force Hc, a lower noise level and a higher playback output:

(1) Under the title "Sputtered Multilayer-Films For Digital Magnetic Recording" of IEEE Transactions on Magnetics: Vol. 15. No. 3. P. 1135, issued July 1979, there appears a description to the effect that a cobalt single layer involves a decrease in a coercive force with an increasing film thickness, but that the cobalt/chromium stacked layer involves a substantially constant coercive force with an increase in a total film thickness.

(2) JPN PAT APPLN KOKAI PUBLICATION No. 63-146219 proposes forming a magnetic recording layer of a thin-film medium by a plurality of magnetic layers and inserting a non-magnetic intermediate layer between the adjacent magnetic layers whereby a multilevel magnetic layer type magnetic recording medium is provided with the magnetic coupling between the magnetic layers being lowered and the medium-causing noise being lowered.

(3) JPN PAT APPLN KOKAI PUBLICATION No. 61-34721 proposes a magnetic recording medium with a CoCr layer stacked on a CoPt layer. In the proposed medium, the overlying CoCr layer is formed on the underlying CoPt layer in a better orientation state and, at the same time, an adequate magnetic characteristic is exhibited with the CoPt layer as an intra-plane recording layer, so that, as a whole, a playback output is improved in a long wavelength range while exhibiting an advantage of a vertical recording system in a short wavelength range.

(4) JPN PAT APPLN KOKAI PUBLICATION No. 61-194635 proposes forming an alternate layer structure of a Co thin film and Pt thin film, that is, a layer structure of two or more thin films, and subjecting the layer structure to heat treatment to provide a thin film permanent magnet.

(5) JPN PAT APPLN KOKAI PUBLICATION No. 62-257616 proposes a vertical magnetic recording medium in which a multi-level magnetic thin film structure for vertical magnetic recording includes a non-magnetic nucleus-forming thin film having a substantially hexagonal packed crystal structure and a magnetic thin film formed of an alloy of cobalt and an element selected from the group consisting of platinum, nickel, rhenium and palladium. It was reported there that, with the use of such a structure, it was possible to enhance a coercive force which would otherwise be inadequate for a single thin film and to obtain a practically applicable vertical magnetic recording medium.

(6) JPN PAT APPLN KOKAI PUBLICATION No. 02-210614 proposes a magnetic recording medium provided by forming a mutilevel structure with two or more CoCrPt magnetic thin films and inserting a non-magnetic thin film between the respective magnetic thin films and, by doing so, making a playback output and C/N ratio high.

(7) JPN PAT APPLN KOKAI PUBLICATION No. 02-281414 proposes a stacking layer medium for horizontal recording use which has an alternate structure having a cobalt-based alloy magnetic film including platinum or nickel in the alloy and a non-magnetic spacer film with a recording layer structure comprising more than one recording layer and one spacer film and, by doing so, improving an S/N.

(8) JPN PAT APPLN KOKAI PUBLICATION No. 04-60918 proposes a vertical magnetic recording medium provided by forming a CoCrNi film on a Cr film and a CoCr-based alloy film on the CoCrNi film and, by doing so, making a playback output larger and the medium lower in noise level.

(9) JPN PAT APPLN KOKAI PUBLICATION No. 04-60917 proposes a vertical magnetic recording medium provided by forming a CoCrNi film on a substrate and a CoCr-based alloy film on the CoCrNi film and, by doing so, making a playback output larger.

(10) JPN PAT APPLN KOKAI PUBLICATION No. 04-133306 proposes the method for manufacturing a vertical magnetization film by bombarding, with ions, an artificial lattice film manufactured by alternately arranging a Co layer and Pt and/or Pd layer in a stacked way and, by doing so, satisfying the coercive force and square-loop ratio.

(11) JPN PAT APPLN KOKAI PUBLICATION No. 04-189737 proposes a magnetic recording medium which, in order to make its S/N ratio larger and obtain a better overwriting a characteristic, uses two layers as a magnetic layer structure and utilizes their different magnetization inversion mechanisms.

In the above-mentioned known documents, discussions have been made on the respective magnetic layer layout of the stacked layer structure in terms of the coercive force, output and noise.

The inventors have variously studied the magnetic recording media having those magnetic recording layers of such a multilevel structure, that is, studied such magnetic receding layers on the practical disk apparatuses and found that the data is less likely to be played back after a few years. They have studied the noise in the media probably resulting from one of these reasons and found that steady-state noise is very small immediately after the data has been recorded on the media but that noise increases with the lapse of time and becomes very larger after the passage of a few years. This phenomenon is probably ascribable to the thermal fluctuation in the medium as set out above. Further it has also been found that this phenomenon markedly occurs in particular in those magnetic recording media of a multi-level (multi-layered) structure.

For the above-mentioned magnetic recording media, particularly those having a multi-layered structure for achieving the lowering of the noise, there were the problem that the degeneration of the characteristic arises with the passage of time due to an effect of noise caused by the thermal fluctuation involved.

BRIEF SUMMARY OF THE INVENTION

An object of the present invention is to provide a magnetic recording medium which can improve the quality of a played-back signal and lower an error rate.

Another object of the present invention is to provide a method for manufacturing a magnetic recording medium which can improve the quality of a played-back signal and lower an error rate.

Another object of the present invention is to provide a magnetic recording medium which ensures a high S/N ratio and is less likely to be affected by a thermal fluctuation.

Another object of the present invention is to provide a magnetic recording medium which ensures a high S/N ratio and can generate a large playback output.

According to the present invention, a magnetic recording medium comprising a substrate and a magnetic film formed on the substrate and including magnetic crystal grains in a non-magnetic matrix, wherein a condition given below is satisfied:

$$d^2 \cdot t \cdot Ir/(v \cdot Isb) \geq 0.75$$

where
- t: the thickness of the magnetic film;
- Ir: a remanent magnetization moment of the magnetic film;
- d: an average particle size of the magnetic crystal grains in an intra-film direction of the magnetic film; and
- v·Isb: an activated magnetization moment of the magnetic film.

According to the present invention, a method for manufacturing a magnetic recording medium including the step of forming a magnetic film, including magnetic crystal grains in a non-magnetic matrix, on a substrate by sputtering, wherein sputtering is done in separate steps and the following condition is satisfied:

$$d2 \cdot t \cdot Ir/(v \cdot Isb) \geq 0.75$$

where
- t: the thickness of the magnetic film;
- Ir: a remanent magnetization moment of the magnetic film;
- d: an average particle size of the magnetic crystal grains in an intra-film direction of the magnetic film; and
- v·Isb: an activated magnetization moment of the magnetic film.

According to the present invention, a magnetic recording medium comprises a substrate and a magnetic film containing magnetic crystal grains in a non-magnetic matrix, wherein the magnetic film is of such a type that a closest packed array is dominant in at least one of a thickness direction and intra-film direction of the magnetic film.

According to the present invention, a magnetic recording medium comprising a substrate and a magnetic film formed on a substrate and including magnetic crystal grains in a non-magnetic matrix, wherein a volume ratio of the non-magnetic matrix in the magnetic film is at least 30% and a magnetic anisotropy energy (Hk·Ms, Hk: an anisotropy magnetic field, Ms: a saturated amount of magnetization) of the magnetic particles is at least $4 \times 16^{+6}$ erg/cc.

According to the present invention, a magnetic recording medium comprising a substrate and a recording layer formed on the substrate wherein the recording layer is of such a structure as to have a plurality of magnetic films with a non-magnetic intermediate film interposed therebetween and Ku·V/kT's (Ku: a magnetic anisotropy energy of the magnetic film, V: a volume of the magnetic particle, K: Boltzmann constant, and T: the absolute temperature) of the magnetic films are substantially the same or approximate.

Additional object and advantages of the invention will be set forth in the description which follows, and in part will be obvious from the description, or may be learned by practice of the invention. The object and advantages of the invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

Explanation will be given below about the present invention.

The first aspect of the present invention is characterized in that the ratio of the remanent magnetization moment to activated magnetization moment is 0.75 or more.

In the magnetic recording medium thus constructed, the magnetic interaction between the magnetic crystal grains becomes smaller in the thickness direction of the magnetic film and, with the above-mentioned ratio set to be 1.5 or more, the magnetic separation of the magnetic crystal grains is made more effectively in the thickness direction of the magnetic film. It is, therefore, possible to lower a noise level without reducing the crystal grains size of the magnetic particles and thickness of the magnetic film to a more-than-necessary extent, that is, without lowering the intensity of a playback signal. By doing so, it is possible to improve the quality of a playback signal and to reduce an error rate.

In the magnetic recording medium of the present invention, the t·Ir as set out below is set toward its increasing direction and it has been conventionally believed not desirable that, with the t·Ir set to be larger, there will be a fall in a recording resolution. In view of a recent S/Nm improvement achieved by the improvement of the recording channel technique, a fall in the recording resolution can be compensated. This can be considered to be linked to the improvement of the error rate.

The magnetic film used in the present invention may be such a type that the magnetic crystal grains are dispersed in a non-magnetic matrix forming a non-magnetic boundary or that oxygen or Cr is segregated in the non-magnetic boundary.

A magnetic recording medium based on the first aspect of the present invention can be formed by sputtering a magnetic film, comprised of magnetic crystal grains in a non-magnetic matrix, on a substrate under an optical condition with the use of a target comprised of the magnetic crystal grains in the non-magnetic matrix. At that time, a magnetic recording medium with a ratio of the remanent magnetization moment and activated magnetization moment of the magnetic film being 0.75 or more can be realized by effecting sputtering a plurality of times, that is, in plural steps.

Figure 1:
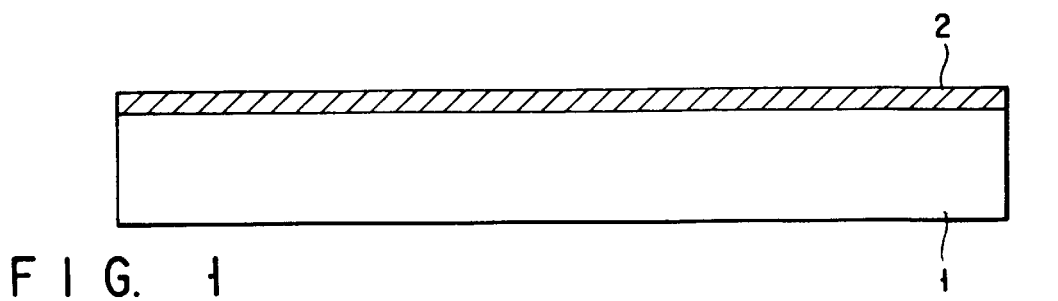
FIG. 1 shows a cross-sectional view showing magnetic recording medium according to a first aspect of the present invention.
Figure 2:
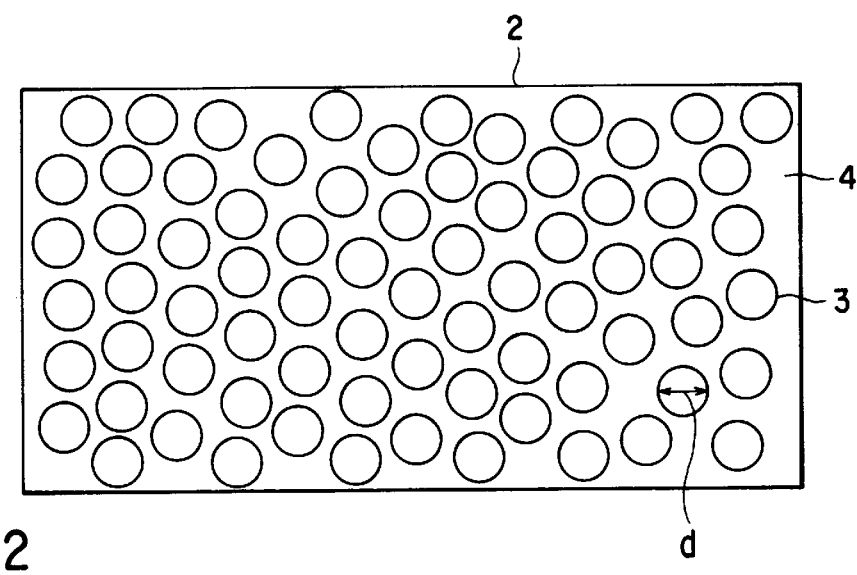
FIG. 2 shows a plane TEM image of a magnetic film in a recording magnetic medium as shown in FIG. 1.

FIG. 1 is a cross-sectional view showing a magnetic recording medium according to one aspect of the present invention and FIG. 2 is a view showing a plane TEM image of a magnetic film. The magnetic recording medium is comprised of a magnetic film 2 formed on a rigid disk-like substrate 1 as a structure with magnetic crystal grains 3 separated by a non-magnetic matrix 4.

Here, based on the first aspect of the present invention, the magnetic particles 3 of the magnetic recording medium are mutually magnetically separated, as shown in FIG. 2, in an intra-film-surface direction of the magnetic film and also in the thickness direction of the magnetic film 2.

With t denoting the thickness of the magnetic film 2; Ir, the remanent magnetization moment; d, the average particle size of the magnetic crystal grains 3 in the intra-film surface direction; and v·Isb, the activated magnetization moment of the magnetic film, the magnetic film 2 is so formed as to satisfy the condition of $$d^2 \cdot t \cdot Ir/(v \cdot Isb) \geq 0.75 \quad (1)$$

more preferably $$d^2 \cdot t \cdot Ir/(v \cdot Isb) > 1.5 \quad (2)$$

Figure 3:
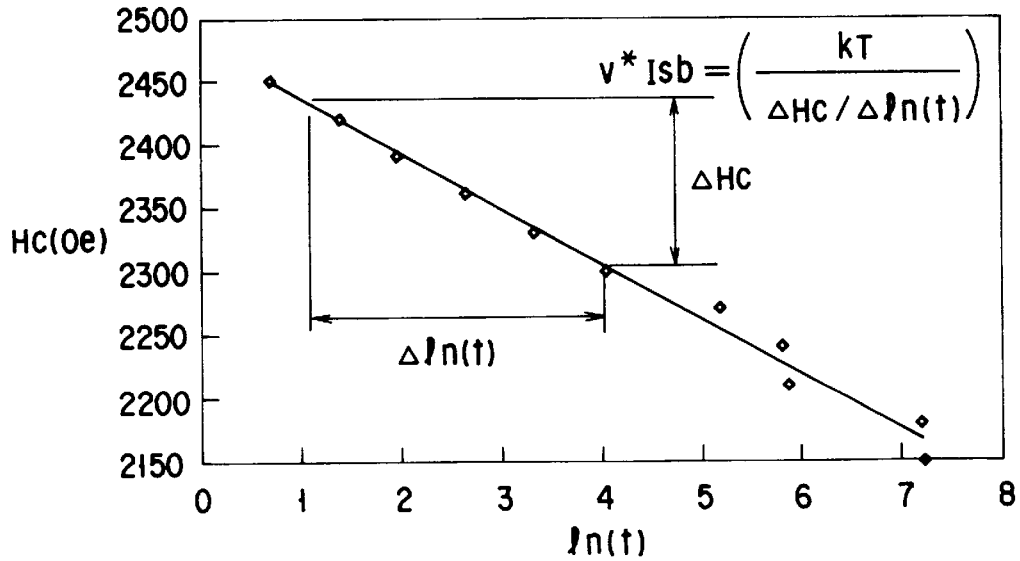
FIG. 3 is a view showing a method for finding v·Isb.

Here, the particle size d represents an average value of 200 balls corresponding to those magnetic crystal grains 4 regarded as such and finding the diameters of such balls from a plane TEM (transmission electron microscope) image of the magnetic film 2 as shown in FIG. 2, the unit thereof being (nm). Further, t·Ir represents a value measured by VSM (vibration sample type magnetometer), the unit thereof being (nm·T). Further, the activated magnetization moment v·Isb is found by the VSM as $$v \cdot Isb = kT/\{\Delta Hc/\Delta ln(t)\} \quad (3)$$

from the time dependence of the coercive force Hc of the magnetic film 2 as shown in FIG. 3.

By doing so, according to the magnetic recording medium of the present invention, the reduction of the noise is achieved, without lowering the intensity of a played-back signal, so that it is possible to improve the quality of the played-back signal and hence to reduce an error rate upon playback. Stated in a qualitative way, this effect is as set out below.

Assuming that those magnetic crystal grains in the magnetic film are so formed as to have a columnar shape magnetically continuous in the thickness direction of the magnetic film, since the volume of the magnetic crystal grains is represented by $(\pi d^2/4) \cdot t$, the total mount of magnetization per crystal grain is given by nearly $(\pi d^2/4) \cdot t \cdot Ir$, this being equal to the activated magnetization moment v·Isb of the magnetic film. That is, $$(\pi d^2/4) \cdot t \cdot Ir = v \cdot Isb \quad (4)$$

Or from $\pi/4 = 0.785$ Equation (3) can be reduced to $$d^2 \cdot t/Ir/v \cdot Isb = 0.785 \quad (5)$$

Here, making $d^2/t/Ir/v/Isb$ greater than, for example, 0.785 is tantamount to magnetically separating those magnetic crystal grains, in the thickness direction, columnarly longer in the thickness direction of the magnetic film and weakening magnetic interaction. That is, the greater $d^2 \cdot t \cdot Ir/v \cdot Isb$, the smaller the magnetic interaction between the magnetic crystal grains in the thickness direction of the magnetic film, so that the reduction of the noise can be achieved. At this time, it does not matter even if the magnetically separated thickness-direction position differs from place to place in the film plane. Further, even if there is no non-magnetic layer, the magnetic separation can also be achieved by a difference in orientation if the magnetic crystal grain have a greater anisotropy.

In consequence, unlike the conventional method according to which the particle size as well as the thickness of the magnetic film is reduced, it is possible to lower the noise, without lowering the intensity of a played-back signal, and to, by doing so, lower an error rate.

According to the experiments by the inventors, it is possible to realize a lower error rate of the order of below $e^{-5}$ capable of adequate error correction when the equation $$d^2 \cdot t \cdot Ir/(v \cdot Isb) \geq 0.75$$

is satisfied. It has been confirmed that, in the case where the equation $$d^2 \cdot t \cdot Ir/(v \cdot Isb) > 1.5$$

is satisfied, it is possible to realize a lower error rate of the order of below $e^{-11}$, a value practically tolerable without any error correction.

The second aspect of the present invention is characterized in that, in the magnetic film, those magnetic crystal grains are so arranged as to provide a closest packed array in at least one of the film thickness direction and intra-film-surface direction. Due to the magnetic crystal grains being arranged as such a closest packed array, it is possible to make the distance between the magnetic crystal grains at over a given value without making the non-magnetization ratio in the boundary greater.

Here, the closest packed array is intended to normally mean a structure having six closest crystal grains. In this connection it is not necessarily required that all the magnetic layers take the closest packed array. It is only necessary that the closest-packed array be dominant. In a stricter sense of the word, the array may not be the closest one and it is only necessary that it be a close-packed structure.

Further, the second aspect of the present invention is characterized in that the volume ratio of the non-magnetic boundary in the magnetic film is at least 30% and that the magnetic anisotropy energy (Hk·Ms) of the magnetic film is at least $4 \times 10^{+6}$ erg/cc, provided that Hk denotes the anisotropy magnetic field of the magnetic particles and Ms, a saturated amount of magnetization of the magnetic film. If the volume ratio of the non-magnetic crystal grain boundary in the magnetic field is at least 30%, mutual magnetic crystal grains are magnetically separated, by the non-magnetic boundary, in a better state, so that the magnetic interaction among the magnetic crystal grains becomes adequately small without the particle size of the magnetic crystal grains being made smaller than necessary. And the noise in the playback output is effectively reduced, so that the S/N ratio of the medium is improved. Further, by setting the magnetic anisotropy energy Hk·Ms of the magnetic film to $4 \times 10^{+6}$ erg/cc or more, the recorded magnetized state is less likely to produce a change with time due to the effect of the thermal fluctuation, so that a lower error rate is obtained for a long period of time.

If the volume ratio of the non-magnetic field in the magnetic film exceeds 60%, the magnetization anisotropy energy Hk·Ms of the magnetic film is hard to attain beyond $4 \times 10^{+6}$ erg/cc and it is desirable that the volume ratio be 60% or lower.

The magnetic crystal grains of the magnetic film can be formed as a main constituent, for example, in a CoPt alloy and the substrate has, for example, a Cr film serving as an underlying film.

Figure 4:
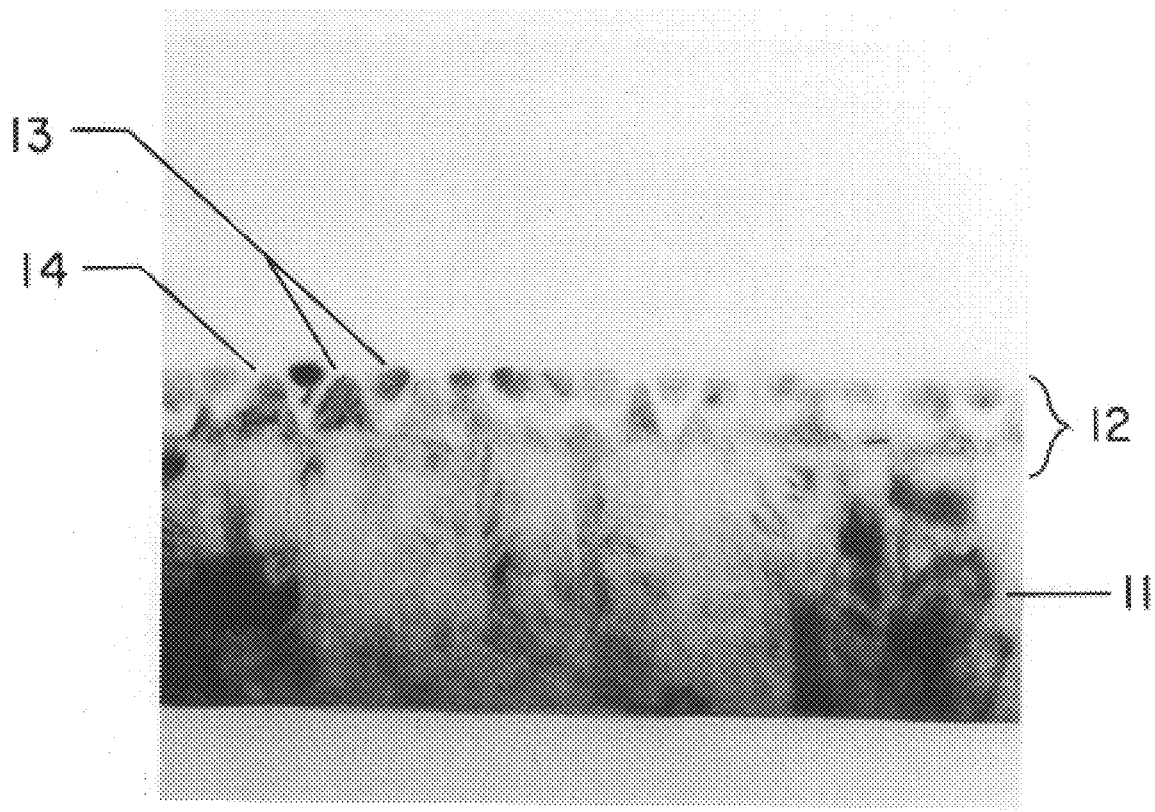
FIG. 4 is a photomicrograph showing a magnetic recording medium according to a second aspect of the present invention.

FIG. 4 is a photomicrograph showing a magnetic recording medium according to a third aspect of the present invention. The magnetic recording medium is so constructed as to form the magnetic film 12 on a rigid disk-like substrate 11 and the magnetic film 12 is of such type that magnetic crystal grains 13 are separated by a non-magnetic boundary 14.

Here, the volume ratio of the non-magnetic boundary 14 in the magnetic field 12 is at least 30%, preferably at most 60%, and the magnetization anisotropy energy (Hk·Ms) of the magnetic film 12 is at least $4 \times 10^{+6}$ erg/cc, the features of which are different for the conventional magnetic recording medium.

Further, the magnetic film 12 is so formed as to provide an alternate array in the thickness direction of the magnetic film 12 as shown in FIG. 4 and, preferably, to also provide an alternate array in an intra-surface direction of the magnetic film 12. In other words, the magnetic crystal grains 13 is of such a type that those adjacent particles in the thickness direction of the magnetic film 12 are displayed in the intra-film direction and that those adjacent crystal grains in the intra-film direction are displayed in a direction orthogonal to this direction.

According to the magnetic recording medium so constructed, the medium is better in the S/N ratio and is less likely to suffer an effect of thermal fluctuation and it is possible to obtain a large playback output.

The third aspect of the present invention is characterized in that Ku·V/kT's (Ku, the magnetization anisotropy energy of the magnetic film, V: the volume of the magnetic crystal grains, k: Boltzmann constant, and T: the absolute temperature) of a plurality of magnetic films providing a layered structure with a non-magnetic intermediate film inserted therebetween are made substantially equal to each other, preferably, the difference in Ku·V/kT of those magnetic films is within ±15%.

In the magnetic recording medium according to the third aspect of the present invention, the recording layers provide the multi-layer structure with the non-magnetic intermediate film inserted therebetween and basically, regarding the noise immediately after the recording of data, it is possible to achieve the lowering of the noise. By setting the Ku·V/kT's of the respective magnetic films substantially equal to each other and, preferably, the Ku·V/kT to 80 or more, the noise caused by the thermal fluctuation can be effectively reduced without impairing the lowering of the noise level.

Figure 5:
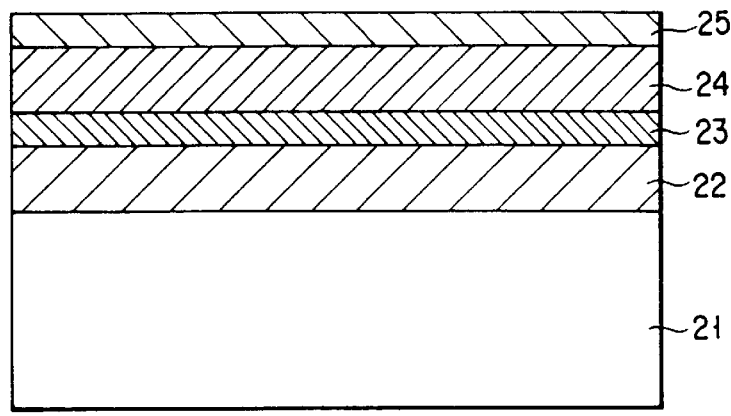
FIG. 5 is a cross-sectional view showing a structure of a magnetic recording medium according to a third aspect of the present invention.

FIG. 5 is a cross-sectional view showing a structure of a magnetic recording medium according to the third aspect of the present invention. As shown in FIG. 5, the magnetic recording medium is so constructed as to sequentially form a first magnetic film 22, non-magnetic intermediate film 23, second magnetic film 24 and protective film 25 on a rigid disk-like substrate 21.

Here, the Ku·V/kT's of the first and second magnetic films 22 and 24 are characterized in that they are set to be substantially the same, preferably, 80 or more in either case. By doing so, it is possible to lower the level of the noise immediately following the recording of data in the layer structure above and to lower the level of the noise resulting from the thermal fluctuation.

The present invention will be explained below in conjunction with practical Examples.

EXAMPLE 1

As a substrate 1 a glass substrate was prepared having a Cr film initially formed as an underlying film. With the use of a target obtained by mixing a 50 volume percent of CoPt magnetic particles in an $SiO_2$ matrix, a $CoPt-SiO_2$ film was formed as a magnetic film 2 on the glass substrate while applying an RF bias and a magnetic recording medium as shown in FIGS. 1 and 2 was manufactured. The $CoPt-SiO_2$ film had a granular film structure with the CoPt magnetic crystal grains dispersed in the $SiO_2$ matrix. The $CoPt-SiO_2$ film was formed with varying sputtering times.

The thus formed $CoPt-SiO_2$ film was measured for the static magnetic characteristic and activated magnetic moment. Further, the size of the particles (crystal grains) were measured while TEM observing the $CoPt-SiO_2$ film in its intra-surface direction. The crystal grains was found separated by a boundary primarily of $SiO_2$.

Then information was written by a high Bs (saturated magnetic flux density) head on the thus manufactured magnetic recording medium and the written information was played back by an MR head (magnetoresistance effect head) under a shield interval 0.2 $\mu$m and playback track width 1.8 $\mu$m. The medium was measured for its So/Nm ratio and the error rate was evaluated through the playback of data by a maximum likelihood decoding methods, the results of which are shown in Table 1.

TABLE 1

| Sample No. | t · Ir (nm · T) | v · Isb (nm$^3$/T) | Average particle size (nm) | d$^2$ · t · Ir/ v · Isb | So/Nm (dB) | Error rate |
|---|---|---|---|---|---|---|
| 1 | 15.0 | 2.00e$^{+3}$ | 15 | 1.68 | 34 | 2e$^{-11}$ |
| 2 | 12.9 | 1.70e$^{+3}$ | 14 | 1.49 | 32 | 1e$^{-8}$ |
| 3 | 10.3 | 1.63e$^{+3}$ | 14 | 1.24 | 31 | 5e$^{-8}$ |
| 4 | 8.8 | 1.38e$^{+3}$ | 12 | 0.92 | 31 | 3e$^{-7}$ |
| 5 | 6.8 | 1.30e$^{+3}$ | 12 | 0.75 | 30 | 8e$^{-7}$ |
| 6 | 6.3 | 1.26e$^{+3}$ | 12 | 0.72 | 27 | 4e$^{-4}$ |
| 7 | 4.1 | 1.00e$^{+3}$ | 12 | 0.59 | 26 | 2e$^{-3}$ |
| 8 | 7.3 | 2.00e$^{+3}$ | 13 | 0.61 | 26 | 3e$^{-4}$ |
| 9 | 6.3 | 2.39e$^{+3}$ | 13 | 0.44 | 24 | 4e$^{-3}$ |
| 10 | 4.1 | 1.19e$^{+3}$ | 12 | 0.49 | 26 | 6e$^{-3}$ |
| 11 | 3.0 | 1.38e$^{+3}$ | 11 | 0.26 | 22 | <1e$^{-2}$ |

Table 1 shows the results of the measurement for the So/Nm ratio and error rate on those samples 1 to 11 under various combinations of t·Ir (nm·T), v·Isb (nm$^3$·T), d and d$^2$·t·Ir/(v·Isb). From the results it has been found that the v·Isb varies depending upon the film thickness t of the $CoPt-SiO_2$ film. Further, the So/Nm, that is, a noise level varies in a way to corresponding to the v·Isb. For the error rate, however, there is no correlation to v·Isb.

As evident from Table 1, if the condition $$d^2 \cdot t \cdot Ir/(v \cdot Isb) \geq 0.75$$

is satisfied (samples 1 to 5), it is possible to obtain a lower error rate of the order of below e$^{-5}$. If the error rate is of the order of this value, adequate correction can be achieved through the error correction of a playback system.

If, in particular, the condition $$d^2 \cdot t \cdot Ir/(v \cdot Isb) > 1.5$$

is satisfied (sample 1), it is possible to realize a lower error rate of the order of below e$^{-11}$ and to eliminate the need to make error correction.

As Control, on the other hand, a CoCrPtTa/Cr film was formed on an Si substrate, under varying sputtering times in a similar way as set out above, with the use of a CoCrPtTa target and a magnetic recording medium was manufactured. These CoCrPtTa/Cr films were measured for the static magnetic characteristic and activated magnetic moment and it has been found that, when measurement was made, under the TEM observation, in an intra-film direction for the size of the magnetic crystal grains, there were not obtained any films satisfying the condition $$d^2 \cdot t \cdot Ir/(v \cdot Isb) \geq 0.75.$$

Further, information was written onto the magnetic recording medium, playback was effected with the use of the MR head and the error rate was evaluated. From these it has been found that the error rate is of the order of above e$^{-4}$, a value either difficult or impossible to make error correction, that is, so great as not to achieve a practical application.

Figure 6:
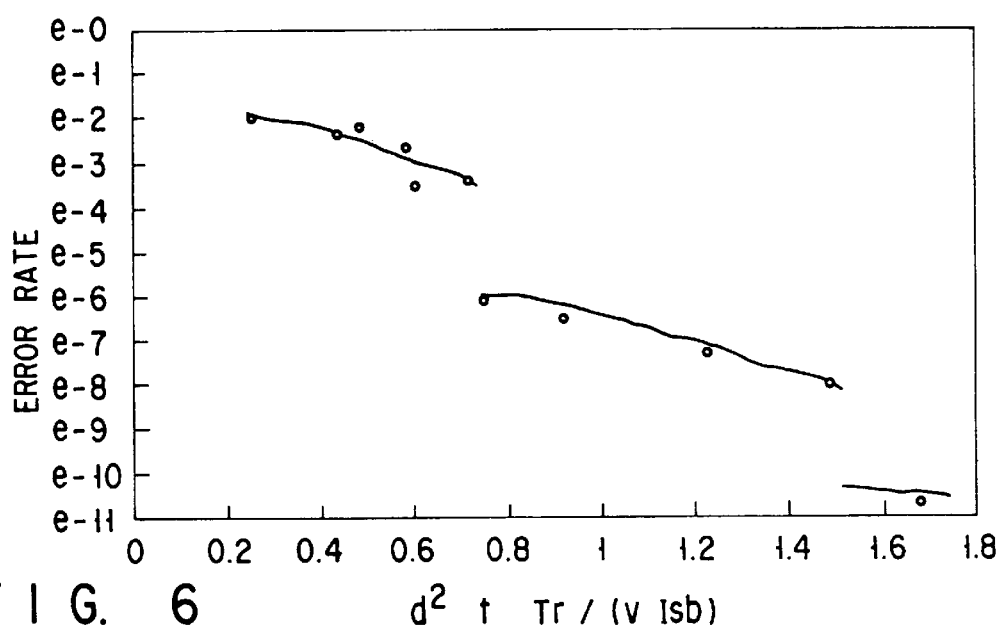
FIG. 6 is a graph showing a relation of $d^2 \cdot t \cdot Ir/(v \cdot Isb)$ and error rate of a magnetic recording medium manufactured by a method of Example 1.

FIG. 6 shows a relation between the d$^2$·t·Ir/(v·Isb) and the error rate of those magnetic recording media manufactured by the method used on the Example 1. From FIG. 6 it has been found that the error rate of the order of below $e^{-5}$ is realized under the condition of $$d^2 \cdot t \cdot Ir/(v \cdot Isb) \geq 0.75$$

and that much lower error rate can also be realized under the condition $$d^2 \cdot t \cdot Ir/(v \cdot Isb) > 1.5.$$

Figure 7:
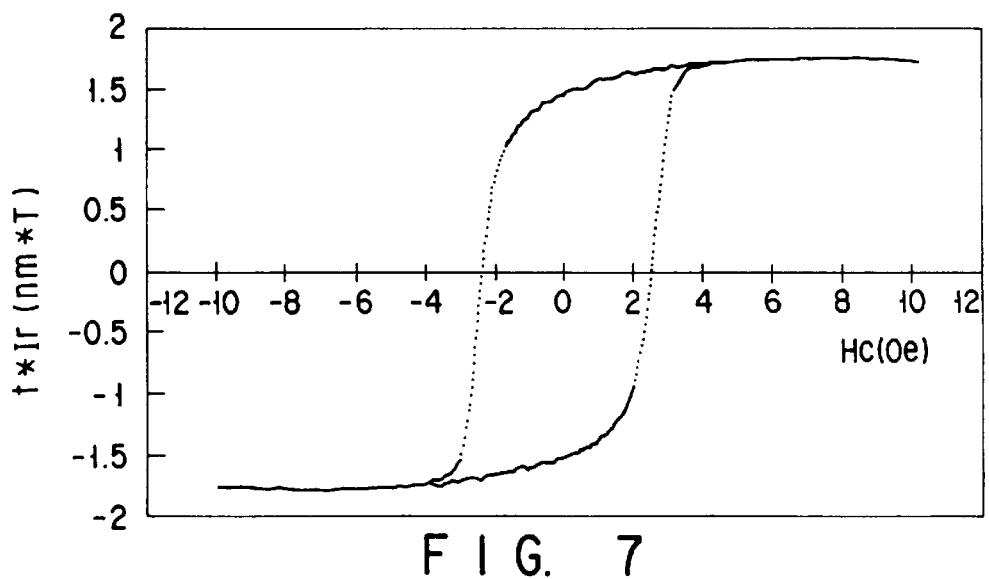
FIG. 7 is a graph showing a relation of a coercive force Hc and Ir·t of a recording magnetic medium manufactured by the method of Example 1.

FIG. 7 shows the magnetic characteristic graph, that is, a relation between the magnetic coercive force Hc and the Ir·t.

EXAMPLE 2

As a substrate 1, a glass substrate was prepared having a V film formed as an underlying film. A CoPtCrO/V film was formed, by a DC sputtering, on the glass substrate in an oxygen-containing Ar atmosphere with the use of a CoPtCr target. At this time, such magnetic recording media of varying thicknesses were manufactured under varying sputtering times.

The thus formed CoPtCrO/V film were measured for the static magnetic characteristic and activated magnetic moment. Further, the size of the magnetic crystal grains (crystal granules) were measured under the TEM observation in an intra-plane direction of the CoPtCrO/V film. The CoPtCrO/V film was formed of amorphous substance and crystalline substance and the magnetic crystal grains were separated by an amorphous boundary where Cr or oxygen was segregated.

Then, as in the case of the Example 1, information was written into the thus manufactured magnetic recording media with the use of a high Bs head and played back with an MR head under a shield interval 0.2 μm and playback track width 1.8 μm. The magnetic recording media were measured for the signal-to-noise (So/Nm) ratio and the error rate was evaluated through the playback of data using a maximum likelihood decoding method. The results of the measurement are as shown in Table 2.

TABLE 2

| Sample No. | t · Ir (nm · T) | v · Isb (nm³/T) | Average particle size (nm) | $d^2 \cdot t \cdot Ir/$ $v \cdot Isb$ | So/Nm (dB) | Error rate |
|---|---|---|---|---|---|---|
| 12 | 12.0 | 2.30e$^{+3}$ | 12 | 0.75 | 30 | 4e$^{-7}$ |
| 13 | 8.9 | 1.38e$^{+3}$ | 12 | 0.93 | 31 | 2e$^{-8}$ |
| 14 | 7.5 | 1.10e$^{+3}$ | 11 | 0.83 | 32 | 5e$^{-8}$ |
| 15 | 5.3 | 0.88e$^{+3}$ | 10 | 0.60 | 27 | 4e$^{-4}$ |
| 16 | 4.1 | 1.10e$^{+3}$ | 8 | 0.24 | 24 | <1e$^{-2}$ |

As in the case of Table 1, Table 2 shows the results of the measurement for the So/Nm ratio and error rate on those samples 12 to 16 under various combinations of t·Ir (nm·T), v·Isb (nm³·T), d and $d^2 \cdot t \cdot Ir/(v \cdot Isb)$. From the results of measurement it has been found that the v·Isb varies depending upon the film thickness t of the CoPtCrO/V film. Further, the So/Nm ratio, that is, the noise level, varies in a way to correspond to the v·Isb. For the error rate, there is no correlation to the v·Isb.

From Table 2 it is found that, when the condition $$d^2 \cdot t \cdot Ir/(v \cdot Isb) \geq 0.75$$

is satisfied (samples 12 to 14), it is possible to obtain a lower error rate of the order of below $e^{-5}$ and to achieve an adequate practical application through the error correction of a playback system.

EXAMPLE 3

As a substrate in FIG. 1, a glass substrate was prepared having a V film formed as an underlying film and a CoPtCr/V film was formed, by a DC sputtering, on the glass substrate in an oxygen-containing Ar atmosphere with the use of a CoPtCr target. At this time, according to Example 3, resting times were provided in a whole sputtering time period, that is, sputtering was made in plural steps to form the above-mentioned CoPtCrO/V film.

The thus formed CoPtCrO/V film were measured for the static magnetic characteristic and activated magnetic moment. Further, the size of the magnetic crystal grains (crystal granules) was measured, under the TEM observation, in an intra-plane direction of the CoPtCrO/V film.

Then, as in the case of Examples 1 and 2, information was written into the thus manufactured magnetic recording media with a high Bs head under a shield interval 0.2 μm and playback track width 1.8 μm. The media were measured for the signal-to-noise (So/Nm) ratio and the error rate were evaluated through the playback of data using a maximum likelihood decoding method. The results of the measurement are shown in Table 3.

TABLE 3

| Sample No. | t · Ir (nm · T) | v · Isb (nm³/T) | Average particle size (nm) | $d^2 \cdot t \cdot Ir/$ $v \cdot Isb$ | So/Nm (dB) | Error rate |
|---|---|---|---|---|---|---|
| 17 | 12.0 | 1.10e$^{+3}$ | 12 | 1.57 | 33 | 3e$^{-11}$ |
| 18 | 8.9 | 0.80e$^{+3}$ | 12 | 1.60 | 34 | 2e$^{-11}$ |

As in the case of Tables 1 and 2, Table 3 shows the results of measurement for the So/Nm ratio and error rate on the samples 17 and 18 under various combinations of t·Ir (nm·T), v·Isb (nm³·T), d and $d^2 \cdot t \cdot Ir/(v \cdot Isb)$. From the results above, it has been found that both the samples 17 and 18 satisfy the condition $$d^2 \cdot t \cdot Ir/(v \cdot Isb) > 1.5$$

and it is possible to realize the error rate of the order of below $e^{-11}$ and to achieve a practical application without error correction.

Examples 4 and 5 below are ones according to second aspect of the present invention.

EXAMPLE 4

As a substrate, a glass substrate was prepared having a 20 nm-thick Cr film initially formed as an underlying film and CoPtCr-SiO$_2$ granular films under various volume percentages of the SiO$_2$ providing a non-magnetic boundary (matrix) were formed as a magnetic film on the glass substrate with the use of an SiO$_2$ target and CoPtCr target consisting of Co, 20 at. % Pt, and 3 at. % Cr to provide a disk-like magnetic recording media. The film was formed under the application of an RF bias.

Figure 8:
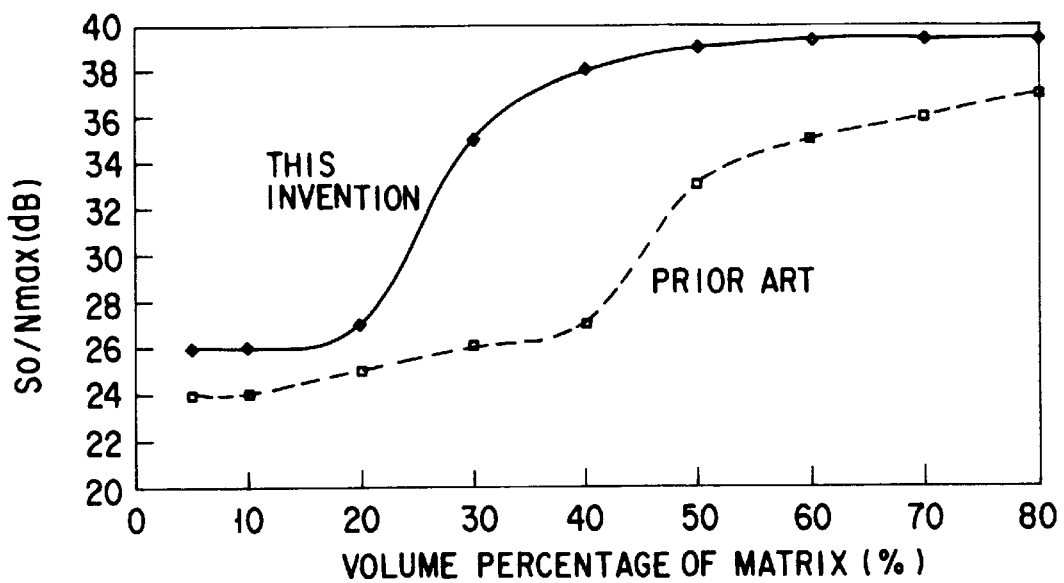
FIG. 8 is a graph showing a relation of a matrix volume ratio of a magnetic film and S/N ratio in a magnetic recording media in Example 4 and Control.
Figure 9:
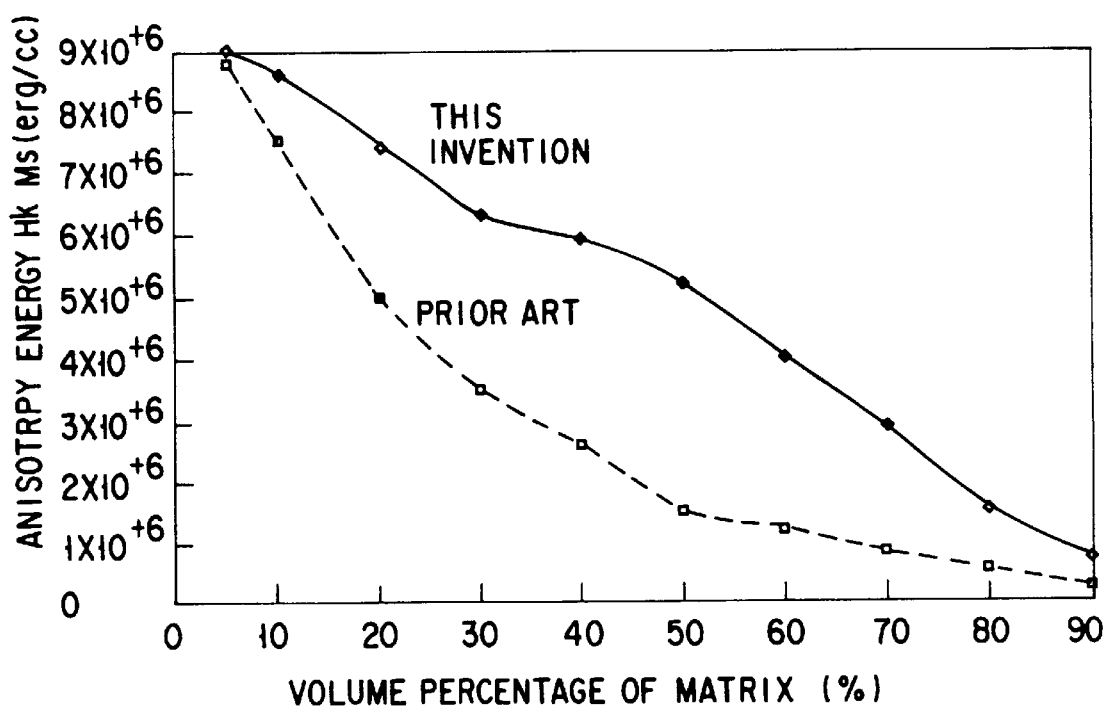
FIG. 9 is a graph showing a relation of a matrix volume ratio of the magnetic film and magnetic anisotropy energy in the magnetic recording media in Example 4 and Control.
Figure 10:
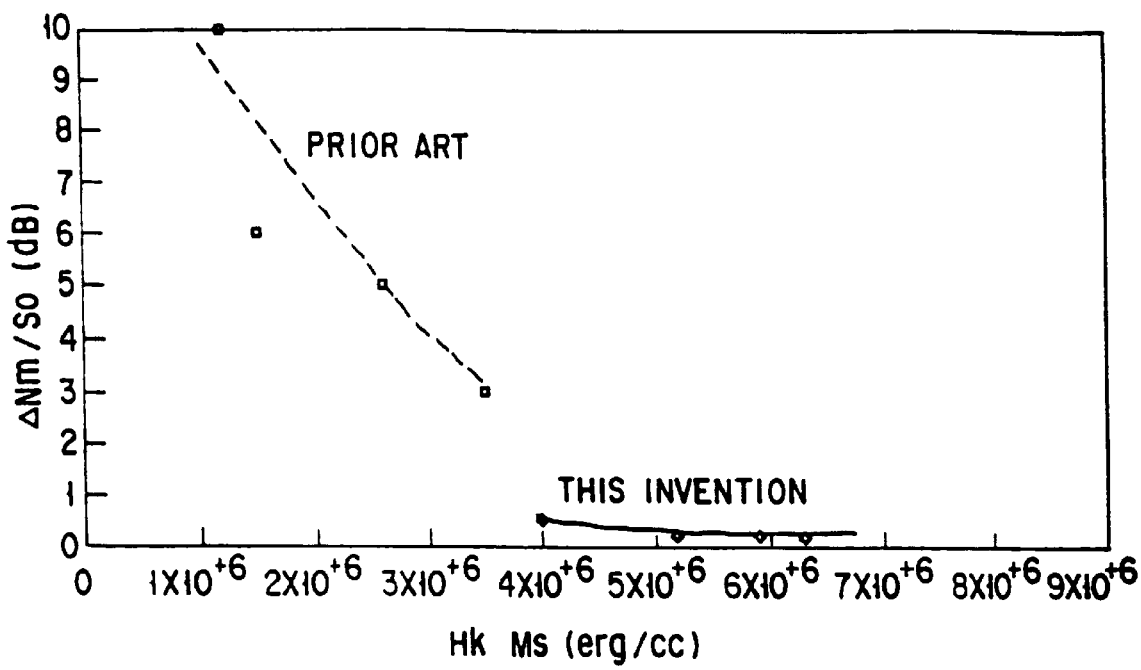
FIG. 10 is a graph showing a relation of a matrix volume ratio of the magnetic film and magnetic anisotropy energy in the magnetic recording media in Example 4 and Control.

FIGS. 8 to 10 show the results of various experiments. FIG. 8 shows a relation of the matrix's volume percentage of a magnetic film in the magnetic recording media of Example 4 and Control to the media's S/N (for So/Nmax, So: a lowpass output and Nmax: a noise level at 150 kFCI) ratioes. FIG. 9 shows a relation of the matrix's volume percentage of the magnetic film and magnetic anisotropy energy (11k·Ms) in the magnetic recording media of Example 4 and Control. FIG. 10 shows a relation of a magnetic anisotropy energy (Hk·Ms) and noise level variation ΔNm/So of the magnetic film in the magnetic recording media of Example 4 and Control.

For the magnetic recording media under various volume percentage ratioes of the matrix's $SiO_2$ where a nonmagnetic boundary is present in the $CoPtCr$-$SiO_2$ granular film, the media's S/N ratioes were measured. As indicated by the solid lines in FIG. 8, when the volume ratio of the $SiO_2$ becomes greater than 30%, the So/Nmax ratio is increased abruptly. The reason for this is that, if the volume percentage ratio of the $SiO_2$ is less than 30%, contact probably occurs among the CoPtCr magnetic crystal grains. This is probably due to an increase in the noise level.

Further, when there was an increase in the volume percentage ratio of the $SiO_2$, there occurred a fall in the saturated magnetization amount Ms of the $CoPtCr$-$SiO_2$ granular film as well as a fall in the anisotropic magnetic field Hk of the CoPtCr crystal grains. However, as indicated by the solid lines in FIG. 9, the value of the magnetic anisotropy energy Hk·Ms of the $CoPtCr$-$SiO_2$ granular film was above $4 \times 10^{+6}$ erg/cc.

Further, in the case where the Hk·Ms was above $4 \times 10^{+6}$ erg/cc, the media, being recorded with information, revealed an increase in the noise level of below 1 dB as indicated by the solid lines in FIG. 10, even if being heated at 190° C. for 30 hours, this level being within a measured error range.

This reveals a very small variation, with time, in the recording magnetic state of the magnetic film caused by thermal fluctuation. It is, therefore, possible to prevent a playback error resulting from the thermal fluctuation.

For the magnetic recording media thus manufactured, the $CoPtCr$-$SiO_2$ granular film was TEM observed in the thickness direction and it has been confirmed that, as shown in FIG. 4, spherical CoPtCr magnetic crystal grains are alternately grown, as a closest packed array, in the thickness direction from the substrate surface.

As Control, a $Co$-$SiO_2$ granular film was formed directly on a substrate with the use of a Pt and a Pure Co and $SiO_2$ (containing no ternary component) target and a magnetic recording medium was manufactured based on the conventional technique. For the magnetic recording medium of Control it has been found that, as indicated by the broken line in FIG. 8, the signal-to-noise So/Nmax ratio is improved when the volume percent of the $SiO_2$ is greater than 40% but that, as indicated by the broken line in FIG. 9, the magnetic anisotropy energy Ms·Hk reveals a value lower than $4 \times 10^{+6}$ erg/cc when the volume percent of $SiO_2$ is greater than 40%.

And information was recorded on the medium of Control and the medium was heated at 190° C. for 30 hours. As indicated by the broken lines in FIG. 10, there was an increase in the noise level and it is, therefore, inferred that there arises a thermal fluctuation effect.

For the magnetic recording medium of Control, it has been confirmed, upon the TEM observation of the $Co$-$SiO_2$ granular film in the thickness direction, that the Co magnetic crystal grains are randomly dispersed in the $SiO_2$ matrix. Further, upon comparing those media of the same So/Nmax ratio in Example 4 and Control, the crystal grain size of the media was found to be greater in the particle size of the medium of Example 4 and Control.

In the magnetic recording medium based on Example 4, the composition of the CoPtCr magnetic crystal grains had 20 to 25 at. % of Pt and 2 to 4 at. % of Cr, but, when the composition of the target was varied, those of 10 to 35 at. % of Pt were as great as 2,000 (Oe) in coercive force and had excellent recording density characteristic. Further, in order that the CoPtCr magnetic crystal grains are so set within this composition range as to correspond to the recording capability of the head, not only Cr but also Nb, Ta, V, Mo, Ti, Zr, Hf, W, etc., can be added to adjust the characteristic of the coercive force. Those compositions with Cr, Ti and Nb, in particular, added thereto revealed excellent characteristic such that there was a small variation in magnetic characteristic under high temperature/high humidity tests conducted. Further, those compositions with V, Nb and Hf added thereto revealed a better So/Nmax ratio than those without addition of these materials.

EXAMPLE 5

As a substrate, a glass substrate was prepared having a 20 nm-thick Cr film formed as an underlying layer. A 30 nm-thick $CoPtCrTa$-$SiO_2$ granular film under a 50 volume percent of $SiO_2$ was formed on the substrate with the use of an $SiO_2$ target and a CoPtCrTa target to provide a disk-like magnetic recording medium. The film was formed under the application of an RF bias. At that time, the size of the magnetic particles was varied under varying intensities of the RF bias.

Figure 11:
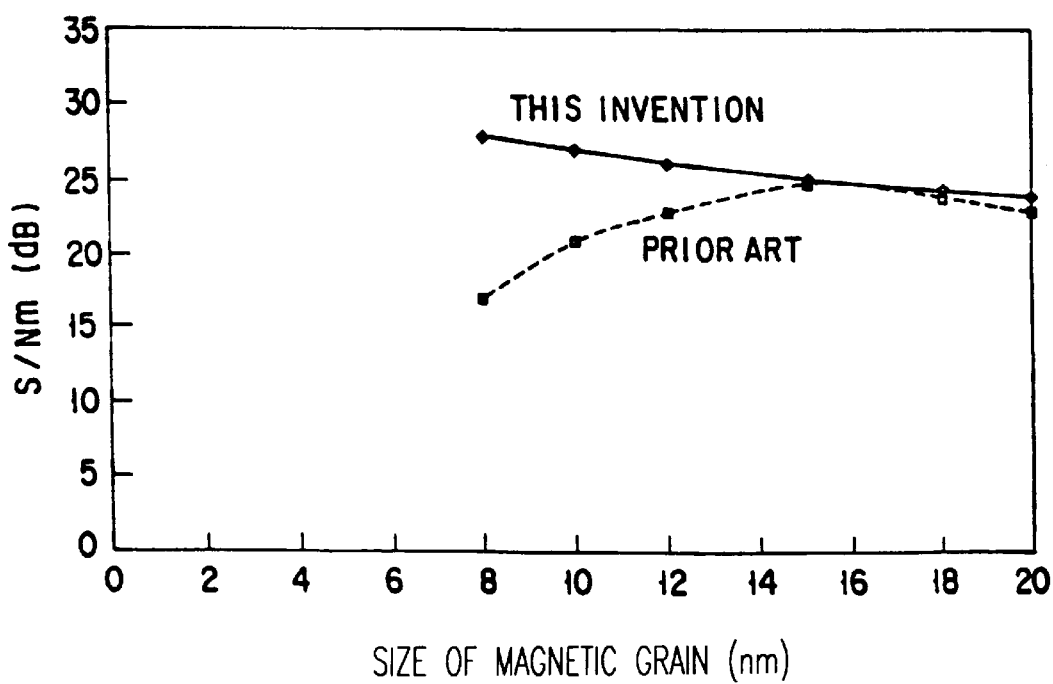
FIG. 11 is a graph showing a relation of a magnetic crystal grain size and S/N (S/Nm) ratio in a magnetic recording media in Example 5 and Control.
Figure 12:
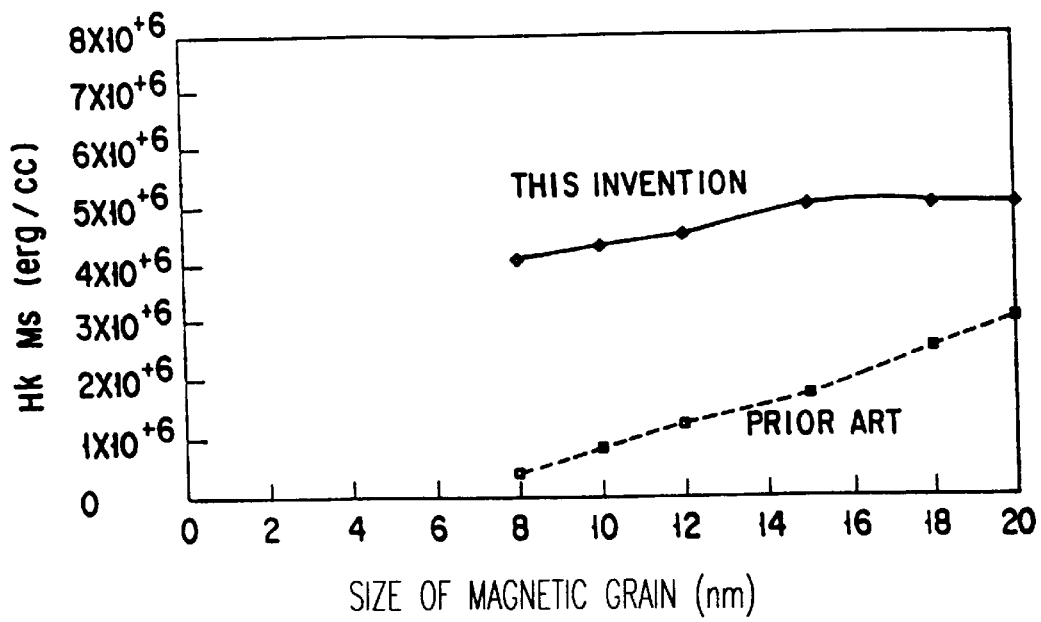
FIG. 12 is a graph showing a relation of the magnetic crystal grain size and magnetic film's magnetic anisotropy energy in the magnetic media in Example 5 and Control.
Figure 13:
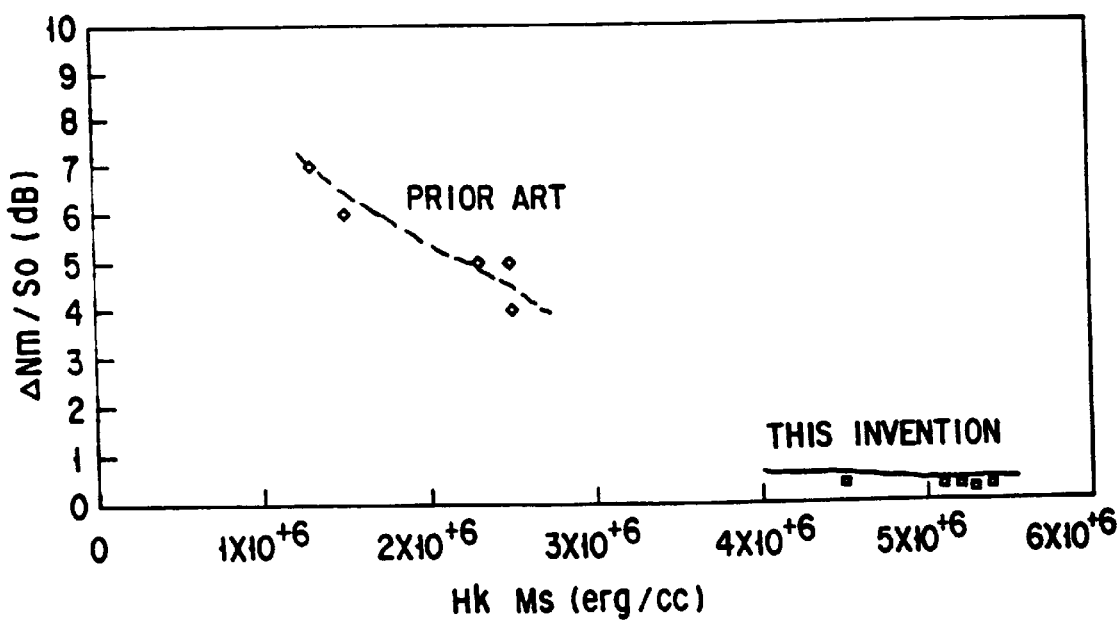
FIG. 13 is a graph showing a relation of the magnetic film's magnetic anisotropy energy and noise level variation in the magnetic recording media in Example 5 and Control.

FIGS. 11 to 13 show the results of various experiments. FIG. 11 shows a relation of the magnetic crystal grain size and S/N (S/Nm) ratio of the magnetic recording medium in Example 5 and Control. FIG. 12 shows a relation of the magnetic crystal grain size of the magnetic recording medium and magnetic anisotropy energy (Ms·Hk) of the magnetic film in Example 5 and Control. FIG. 13 shows a relation between the magnetic film's magnetic anisotropy energy (Ms·Hk) and noise level variation (ΔNm/So ratio) in Example 5 and Control.

As indicated by the solid lines of FIG. 11, the smaller the magnetic crystal grain size, the further the S/Nm ratio was improved. As the magnetic crystal grain size becomes smaller, the anisotropy magnetic field Hk decreases and, as indicated by the solid line in FIG. 12, the value of the magnetic anisotropy energy Hk·Ms decreased. If the Hk·Ms was over $4 \times 10^{+6}$ erg/cc, information was recorded on the medium and, even when the medium was heated at 190° C. for 30 hours, an increase in the noise level was below 1 dB as indicated by the solid lines in FIG. 13 and was in a measurement error range. This indicated that the change, with time, of the recorded magnetized state of the magnetic film resulting from the thermal fluctuation effect is very low. It is, therefore, possible to prevent a playback error resulting from the thermal fluctuation.

On the other hand, a 30 nm-thick $CoNi$-$SiO_2$ granular film under a 50% volume percent of the $SiO_2$ was formed as Control on a substrate with the use of $Co_{80}Ni_{20}$ and $SiO_2$ target. By doing so, a magnetic recording medium was manufactured based on the conventional technique.

The smaller the magnetic crystal grain size, the further the S/Nm was improved. If the magnetic crystal grain size was reduced to a certain extent, the S/Nm was, on the contrary, was decreased as indicated by the broken line in FIG. 11. Even when the magnetic crystal grain size was greater as indicated by the broken line in FIG. 12, the Hk·Ms was not over $4 \times 10^{+6}$ erg/cc.

Further, when the information was recorded on the magnetic recording medium in Control, as indicated by the broken line in FIG. 13, an increase in the noise level probably due to the effect of the thermal fluctuation was seen after the medium was heated at 190° C. for 30 hours.

As already explained above, according to Examples 4 and 5, the magnetic interaction is lowered between the magnetic crystal grains of the magnetic film in the film's thickness direction whereby it is possible to achieve the reduction of the noise level without lowering the intensity of a played-back signal and hence to improve a quality of the played-back signal so that the error rate can effectively be reduced.

As explained above, according to a second aspect of the present invention, it is possible to provide a magnetic recording medium of a better S/N ratio and high reliability which can tolerate any thermal fluctuation.

That is, according to a third aspect of the present invention, the volume percent of the non-magnetic boundary in the magnetic film is 30% or more, preferably 60% or less, and the magnetic crystal grains are magnetically separated, in a better state, between the magnetic crystal grains particles in the non-magnetic boundary and, without decreasing the size of the magnetic crystal grains to a more-than-necessary extent, the magnetic interaction between the magnetic crystal grains is made adequately small, so that the noise contained in the playback output is effectively reduced. By setting the magnetic anisotropy energy (Hk·Ms) of the magnetic film to be over $4 \times 10^{+6}$ erg/cc it is possible to lower a change, with time, of the recorded magnetic state resulting from the effect of the thermal energy and to suppress a playback error to a small level over a prolonged period of time.

Further, by forming the magnetic film as an alternate, closest-packed crystal grain structure in at least one of the thickness direction and intra-film-surface direction it is also possible to increase the saturated magnetized amount of the magnetic film and to make a playback output larger.

The following is related to Example 6 according to a third aspect of the present invention.

EXAMPLE 6

As shown in FIG. 5, as a substrate 21, a 2.5-inch glass substrate was prepared and a first magnetic film 22 was formed, by sputtering, with the use of Co-Pt target and, after a non-magnetic intermediate film 23 was formed by sputtering on the first magnetic film 22 with the use of a boron target, a second magnetic film 24 was formed by sputtering on the intermediate film 23 again with the use of the Co-Pt target. Finally, a protective film 25 was formed on the second magnetic film with the use of a carbon target. That is, a hard disk type magnetic recording medium as shown in FIG. 5 was prepared in which the first magnetic film 22 of Co-Pt, intermediate film 23 of boron, second magnetic film 24 of Co-Pt and protective film 25 were sequentially formed over the substrate 21. In this case, sputtering was carried out with the use of a DC magnetron sputtering apparatus.

The thus formed magnetic recording medium was measured, for its magnetic characteristic, with the use of the VSM (vibration sample type magnetometer). The thicknesses of the first and second magnetic films 22 and 24 were varied by varying the sputtering time. At the sputtering time, a very small amount of oxygen was added there with the use of a Co-Pt target formed by varying the Pt composition in a 15-to-28% range. The non-magnetic intermediate film 23 of boron was made to have a thickness of 2 nm. An average crystal grain size D of the magnetic films 22 and 24 was varied mainly by varying a sputtering pressure. The average crystal grain size D was found from the TEM (transmission electron microscope).

The magnetic anisotropy energy Ku was found by a torque measuring method. The noise measurement was made by a recording head (induction type head) under a write track width Tw: 5 μm and gap length 0.3 μm and a playback head (MR head) under a read width Tr: 2.7 μm and gap length 0.27 μm at which time the head levitation amount was 40 nm; the circumferential speed (relative head/medium speed), 5 m/s and recording density, 300 Kfci.

At first, measurement was made for a noise level immediately after data was recorded. Then the medium was allowed to stand at room temperature for one year and measurement was again made for the noise level with the use of the same head. The noise increasing amount a was rated as "small" if it was in a range $0 \leq a < 1$ dB, "medium" if in a range 1 to 3 dB and "large" if in a range exceeding 3 dB.

Under the varying conditions of the thickness δ nm), average crystal grain size D (nm), Ku ($\times 10^6$ erg/cc) and Ku·V/kT of the first and second magnetic films, the noise increasing amount resulting from the noise and thermal fluctuation immediately after data was recorded was measured, the results of which are shown in Table 4.

TABLE 4

| | First magnetic film | | | | Second magnetic film | | | | | |
|---|---|---|---|---|---|---|---|---|---|---|
| | δ(nm) | D(nm) | Ku(×10⁶) erg/cc) | Ku · V/kT | δ(nm) | D(nm) | Ku(×10⁶) erg/cc) | Ku · V/kT | Noise immediately after recording data | Noise increasing amount |
| Example 6 | 10 | 12 | 3.0 | 82 | 10 | 12 | 3.0 | 82 | small | small |
| Example 7 | 12 | 12 | 3.0 | 98 | 12 | 12 | 3.0 | 98 | small | small |
| Example 8 | 14 | 12 | 3.0 | 115 | 14 | 12 | 3.0 | 115 | small | small |
| Example 9 | 12 | 14 | 3.0 | 133 | 12 | 14 | 3.0 | 133 | small | small |
| Example 10 | 10 | 12 | 3.0 | 82 | 8 | 12 | 3.8 | 82 | small | small |
| Example 11 | 10 | 12 | 3.0 | 82 | 8 | 10 | 5.3 | 80 | small | small |
| Example 12 | 12 | 12 | 3.0 | 82 | 14 | 10 | 3.5 | 93 | small | small |
| Example 13 | 14 | 10 | 3.5 | 93 | 12 | 12 | 3.0 | 82 | small | small |
| Control 1 | 10 | 12 | 3.0 | 82 | 10 | 12 | 2.0 | 55 | small | large |
| Control 2 | 10 | 12 | 3.0 | 82 | 10 | 10 | 3.0 | 68 | small | medium |
| Control 3 | 20 | 12 | 3.0 | 164 | 0 | 0 | 0 | 0 | large | small |
| Control 4 | 10 | 12 | 3.0 | 82 | 10 | 12 | 2.4 | 66 | small | large |

Examples 6 to 9 show the case where the thickness δ, average crystal grain size D, magnetic anisotropy energy Ku and Ku·V/kT of the first and second magnetic films are set all under the same conditions. The noise level and noise increasing amount immediately after the data has been recorded on the media were rated as "small" in either case.

Example 10 corresponds to the case where the first and second magnetic films are different in their thickness δ and magnetic anisotropy energy Ku and the same in the Ku·V/kT. This is different from the conventional technique for realizing the reduction of the noise by setting those magnetic films of a multi-layered structure mutually equal. Even in this case, the noise immediately after the recording of the data as well as the noise increasing amount was rated as "small".

Example 11 corresponds to the case where the first and second magnetic films are different all in their film thickness δ, average crystal grain size D and magnetic anisotropy energy Ku. In this case, the Ku·V/kT is equal between the first and second magnetic films and, even in this case, the noise immediately after the recording of the data as well as the noise increasing amount was rated as "small".

Examples 12 and 13 correspond to the case where the first and second magnetic films are different all in the film thickness δ, average crystal grain size D and a magnetic anisotropy energy Ku. The Ku·V/kT's of the first and second magnetic films are somewhat different, their difference being in a range within 15%, and, even in this case, their noise immediately after the recording of the data as well as their noise increasing amount was rated as "small".

Control 1 corresponds to the case where the second magnetic film is lower in magnetic anisotropy energy Ku than the first magnetic film and different in Ku·V/kT from the first magnetic film. In this case, their noise immediately after the recording of the data was small but their noise increasing amount was rated as "large".

Control 2 corresponds to the case where the first and second magnetic films are different in their average crystal grain size D and Ku·V/kT. In this case, their noise immediately after the recording of the data is small but their noise increasing amount is rated as "medium".

Control 3 corresponds to a single layer and, in this case, the noise increasing amount is small but the noise immediately after the recording of the data was rated as "large".

Control 4 corresponds to the case where first and second magnetic films are different in their magnetic anisotropy energy Ku and Ku·V/kT. In this case, the noise after the recording of the data was small but the noise increasing amount was rated as "large".

As evident from the results of experiments, according to the present invention, the first and second magnetic films are substantially equal in their Ku·V/kT and, in a practical application, their difference is suppressed within ±15%. By doing so it is possible to reduce the noise immediately after the recording of the data and, at the same time, suppress the noise increasing amount.

That is, if the Ku·V/kT/s of both the magnetic films are made greatly different as in Controls 1 to 3, then the noise characteristic is restricted by one magnetic film whose Ku·V/kT is greater than the other. If the Ku·V/kT of said one magnetic film becomes too great, the advantage of adopting the multi-layered structure as a recording layer structure is impaired because the noise immediately after the recording of the data is increased. If the Ku·V/kT's of both the magnetic films are set equal as in the present invention, it is possible to suppress the noise increasing amount, that is, lower the noise resulting from the thermal fluctuation, without increasing the noise immediately after the recording of the data.

Further, as commonly shown in Examples 6 to 13, the Ku·V/kT's of the first and second magnetic films are made substantially equal and their values are both over 80. By doing so, the reduction of the noise increasing amount can be effectively realized. That is, if the Ku·V/kT is less than 80 in the medium having the recording layers formed in the multi-layered structure, the noise increasing amount is rated as "large" to "medium" as in Controls 1, 2 and 4 and the thermal fluctuation emerges prominently. If, on the other hand, the Ku·V/kT's of both magnetic films are over 80, in either case, as in the present invention, it is possible to more effectively reduce the noise resulting from the effect of the thermal fluctuation.

Although all the non-magnetic intermediate layers are set to be 2 nm thick in the above-mentioned Examples, how their film thickness should be selected does not constitute any essential matter. It is only necessary to cut the exchange interaction, by the non-magnetic intermediate film, between the first and second magnetic films. And these film thicknesses are properly of the order of 1 to 5 nm. Although the boron is used for the intermediate film, use may be made of, for example, $SiO_2$ instead and it is only necessary to use the non-magnetic film in that case.

Further, in order to provide a coercive force between the first and second magnetic films, the addition of Cr to the second magnetic film is effective.

Although, in the above-mentioned Examples, the magnetic films have been explained as forming a two-layered structure, it is needless to say that, even if they are formed as a three- or more layered structure, it can be applied to the present invention in the same way as set out above.

Since, according to the third aspect of the present invention as set out above in more detail, the recording layer is comprised of a multi-layered structure with the non-magnetic intermediate film formed between the magnetic films, it is possible to realize the reduction of the noise basically regarding the noise immediately after the recording of the data. It is also possible to reduce the noise resulting from the thermal fluctuation, without increasing a steady-state noise immediately after the recording of the data, by making the Ku·V/kT's of the respective magnetic films substantially equal and, preferably, at over 80, and to suppress the error rate of playback data to a lower level for an extended period of time.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalent.

We claim:

1. A magnetic recording medium comprising a substrate and a magnetic film formed on the substrate, the magnetic film including magnetic crystal grains in a non-magnetic matrix, wherein a condition given below is satisfied:

$$d^2 \cdot t \cdot Ir/(v \cdot Isb) \geq 0.75$$

where t: a thickness of the magnetic film;

Ir: a remanent magnetization moment of the magnetic film;

d: an average particle size of the magnetic crystal grains in an intra-film direction of the magnetic film; and v·Isb: an activated magnetization moment of the magnetic film.

2. The magnetic recording medium according to claim 1, wherein the magnetic film satisfies the following condition:

$$d^2 \cdot t \cdot Ir/(v \cdot Isb) > 1.5.$$

3. The magnetic recording medium according to claim 1, wherein the magnetic film is of such a structure that the magnetic crystal grains are dispersed in the non-magnetic matrix.

4. The magnetic recording medium according to claim 1, wherein the magnetic film contains oxygen or Cr concentrated in the non-magnetic matrix.

5. A method for manufacturing a magnetic recording medium including the step of forming a magnetic film, including magnetic crystal grains and a non-magnetic matrix, on a substrate by sputtering, wherein the sputtering is performed a plurality of times and the following condition is satisfied:

$$d^2 \cdot t \cdot Ir/(v \cdot Isb) \geq 0.75$$

where t: a thickness of the magnetic film;

Ir: a remanent magnetization moment of the magnetic film;

d: an average particle size of the magnetic crystal grains in an intra-film direction of the magnetic film; and v·Isb: an activated magnetization moment of the magnetic film.

6. The method according to claim 5, wherein the magnetic film satisfies the following condition:

$$d^2 \cdot t \cdot Ir/(v \cdot Isb) > 1.5.$$

7. The method according to claim 5, wherein the magnetic film is of such a structure that the magnetic crystal grains are dispersed in the non-magnetic matrix.

8. The method according to claim 5, wherein the magnetic film contains oxygen or Cr concentrated in the non-magnetic matrix.

9. A magnetic recording medium comprising a substrate and a magnetic film formed on the substrate and including magnetic crystal grains in a non-magnetic matrix, wherein a volume ratio of the non-magnetic matrix in the magnetic film is over 30% and a magnetic anisotropy energy of the magnetic crystal grains is over $4 \times 10^{+6}$ erg/cc, where the magnetic anisotropy energy is given by Hk·Ms, Hk is an anisotropy magnetic field and Ms is a saturated amount of magnetization.

10. The magnetic recording medium according to claim 9, wherein a volume ratio of the non-magnetic matrix in the magnetic film is 30 to 60%.

11. The magnetic recording medium according to claim 9, wherein the magnetic film is of such a type that a closest packed array is formed in at least one of a film thickness direction and an intra-film direction.

12. The magnetic recording medium according to claim 11, wherein a magnetic crystal grain in the closest packed array has six nearest neighbors.

13. The magnetic recording medium according to claim 9, wherein the magnetic crystal grains contain a CoPt alloy as a main constituent.

14. The magnetic recording medium according to claim 9, wherein the substrate has a Cr film as an underlying film and the magnetic crystal grains contain a CoPt alloy as a main constituent.

15. A magnetic recording medium comprising a substrate and a recording layer formed on the substrate, wherein the recording layer comprises a layered structure of at least two magnetic films and at least one non-magnetic intermediate film, one of the at least one non-magnetic film is sandwiched between each adjacent pair of the at least two magnetic films, each of the at least two magnetic films includes magnetic crystal grains in a non-magnetic matrix, and values of Ku·V/kT of the magnetic films are substantially or approximately the same, where Ku: magnetic anisotropy energy, V: volume of the magnetic crystal grains, k: Boltzmann constant, and T: absolute temperature.

16. The magnetic recording medium according to claim 15, wherein values of Ku·V/kT of the magnetic films are within 15% of each other.

17. The magnetic recording medium according to claim 15, wherein each of the magnetic films has a value of Ku·V/kT of over 80.

18. The magnetic recording medium according to claim 15, wherein the magnetic films have each different compositions as to set coercive forces to be substantially the same.

* * * * *